United States Patent
Chen

(10) Patent No.: US 7,157,845 B2
(45) Date of Patent: Jan. 2, 2007

(54) SINGLE-COMPONENT YELLOW-EMITTING ELECTROLUMINESCENT PHOSPHOR

(75) Inventor: Xianzhong Chen, Sayre, PA (US)

(73) Assignee: Osram Sylvania Inc, Danvers, MA (US)

( * ) Notice: Subject to any disclaimer, the term of this patent is extended or adjusted under 35 U.S.C. 154(b) by 0 days.

(21) Appl. No.: 10/711,634

(22) Filed: Sep. 29, 2004

(65) Prior Publication Data

US 2006/0066208 A1    Mar. 30, 2006

(51) Int. Cl.
*H01J 1/62*    (2006.01)
*C09K 11/54*    (2006.01)

(52) U.S. Cl. .................... 313/485; 252/301 S

(58) Field of Classification Search ............... 313/485; 252/301 R, 301 S
See application file for complete search history.

(56) References Cited

U.S. PATENT DOCUMENTS

| | | | |
|---|---|---|---|
| 4,859,361 A | 8/1989 | Reilly et al. | |
| 5,009,808 A | 4/1991 | Reilly et al. | |
| 5,156,885 A | 10/1992 | Budd | |
| 5,220,243 A | 6/1993 | Klinedinst et al. | |
| 5,244,750 A | 9/1993 | Reilly et al. | |
| 5,307,186 A * | 4/1994 | Izumi et al. | 349/24 |
| 5,643,496 A | 7/1997 | Brese et al. | |
| 5,702,643 A | 12/1997 | Reddy et al. | |
| 6,064,150 A | 5/2000 | Klinedinst et al. | |
| 6,090,311 A | 7/2000 | Brese et al. | |
| 6,153,123 A * | 11/2000 | Hampden-Smith et al. | 252/301.4 S |
| 6,309,700 B1 | 10/2001 | Fan et al. | |
| 6,682,664 B1 | 1/2004 | Chen et al. | |
| 2003/0197460 A1 | 10/2003 | Lee et al. | 313/486 |
| 2005/0001533 A1* | 1/2005 | Huber et al. | 313/485 |
| 2005/0023546 A1* | 2/2005 | Menkara et al. | 257/98 |

FOREIGN PATENT DOCUMENTS

GB    954304    4/1964

* cited by examiner

*Primary Examiner*—Joseph Williams
*Assistant Examiner*—Bumsuk Won
(74) *Attorney, Agent, or Firm*—Robert F. Clark

(57) ABSTRACT

A single-component, yellow-emitting electroluminescent phosphor, a method for making same, and an electroluminescent lamp containing same, are described. The phosphor produces a yellow emission having an x color coordinate from 0.420 to 0.500 and y color coordinate from 0.420 to 0.460 when stimulated by an electric field.

8 Claims, 1 Drawing Sheet

SINGLE-COMPONENT YELLOW-EMITTING ELECTROLUMINESCENT PHOSPHOR

FIELD OF THE INVENTION

This invention is related to electroluminescent phosphors and in particular to electroluminescent phosphors that exhibit a yellow emission when stimulated.

BACKGROUND OF THE INVENTION

Electroluminescence (EL) is the emission of light under electric-field excitation. Based on this mechanism, EL lamps and displays are finding an increasing number of applications in the field of flat panel displays due to the growing demand for portable computers, communication equipment, and consumer electronic products. EL lamps also provide uniform light emission independent of viewing angle and they are insensitive to mechanical shock and vibration. They can be easily dc-driven at 1.5–9 volts by using inverters that generate ac voltages of about 100–300 V (peak-to-peak) at frequencies of 50 to 1000 Hz.

The two major EL lamp constructions are generally referred to as thin-film and thick-film. Thin-film EL lamps are made by depositing alternating thin layers of dielectric materials, phosphors and conductive oxides on a glass substrate using a vapor deposition technique such as CVD. By contrast, thick-film lamps are made by suspending powdered materials in resinous materials and then applying the materials in layers onto a plastic film using conventional screen printing techniques. Hence, the thick-film EL lamps can be thin, flexible and rugged thereby making them suitable for a wider range of lighting applications.

A cross-sectional illustration of a conventional thick-film EL lamp is shown in FIG. 1. The lamp 2 has two dielectric layers 20 and 22. A first conductive material 4, such as aluminum or graphite, coated on a plastic film 12b forms a first electrode of the lamp 2; while a thin layer of a transparent conductive material 6, such as indium tin oxide, coated on a second plastic film 12a forms a second electrode. Sandwiched between the two conductive electrodes 4 and 6 are two layers 20 and 22 of dielectric material 14 which can be, for example, cyanoethyl cellulose or cyanoethyl starch. Adjacent to the first electrode 4 is a layer of dielectric material 14 in which are embedded particles of a ferroelectric material 10, preferably barium titanate. Adjacent to the second electrode 6 is a layer of dielectric material 14 in which are embedded particles of an electroluminescent phosphor 8. The phosphors available for thick-film EL lamps are primarily comprised of zinc sulfide that has been doped with various activators, e.g., Cu, Au, Ag, Mn, Br, I, and Cl. Examples of these phosphors are described in U.S. Pat. Nos. 5,009,808, 5,702,643, 6,090,311, and 5,643,496. Typically, the individual particles of the EL phosphors are encapsulated with an inorganic coating in order improve their resistance to moisture-induced degradation. Examples of such coatings are described in U.S. Pat. Nos. 5,220,243, 5,244,750, 6,309,700, and 6,064,150.

For accent lighting applications, signage, multi-color information displays and the like, it is desirable to provide EL lamp manufacturers with a wide range of emission colors to choose from. Moreover, it is desirable to provide single-component phosphors for each color rather than blends since the different phosphors in the blends will tend to degrade at different rates causing the emission color to shift. Unfortunately, the range of emission colors of EL phosphors tends to be somewhat limited. In particular, the color choices are heavily weighted towards the blue to green region of the visible spectrum with fewer choices available in the yellow to red region.

Zinc sulfide electroluminescent (EL) phosphors co-activated with manganese and copper ions (ZnS:Mn,Cu) are well known. Examples of these phosphors and their methods of manufacture are described in U.S. Pat. Nos. 4,859,361, 5,009,808, and 6,682,664. When stimulated by an electric field in a conventional thick-film electroluminescent lamp, these phosphors exhibit an orange-yellow emission with an x color coordinate of at least 0.520. However, single-component, yellow-emitting electroluminescent phosphors having an emission with an x color coordinate less than 0.510 are not known. Thus, it would be an advantage to be able to provide lamp manufacturers with a yellow-emitting EL phosphor.

SUMMARY OF THE INVENTION

A single-component, yellow-emitting electroluminescent phosphor has been discovered by the inventor. The phosphor of this invention produces a yellow emission having an x color coordinate from 0.420 to 0.500 and y color coordinate from 0.420 to 0.460 when stimulated by an electric field. More preferably, the phosphor produces an emission having an x color coordinate of between 0.450 and 0.500 and a y color coordinate from 0.440 to 0.460. The composition of the phosphor may be represented by the formula ZnS:Cu, Cl,Mn and may additionally contain Au and/or Sb.

In another aspect of the invention, there is provided a method of making the single-component, yellow-emitting electroluminescent phosphor of this invention. In a first firing step, zinc sulfide (ZnS) is blended with appropriate amounts of a source of copper (Cu), zinc oxide (ZnO), sulfur (S), a chloride-containing flux, and, optionally, a source of a metal selected from gold and antimony. The blended mixture is fired in air at a temperature from about 1100° C. to about 1250° C. for about 2 to about 5 hours. The fired material is washed and mechanically worked to induce defects in the crystal structure. The fired material is then blended with appropriate amounts of a copper source, a manganese source, and zinc oxide to form an intermediate mixture. In a second firing step, the intermediate mixture is fired in air at a temperature from about 750° C. to about 950° C. for about 2 to about 5 hours to form the phosphor.

In yet another aspect of the invention, there is provided a thick-film electroluminescent lamp containing the single-component, yellow-emitting electroluminescent phosphor of this invention. The lamp exhibits an x color coordinate from 0.420 to 0.500 and y color coordinate from 0.420 to 0.460 and an initial brightness of at least about 6 foot-Lamberts (ft-L), and more preferably at least about 8 ft-L, when operated at 100V and 400 Hz in a 50% relative humidity (R.H.) and 70° F. environment. In one embodiment, the EL lamp exhibits a half-life of at least about 1000 hours when operated under those same conditions. More preferably, the lamp exhibits a half-life at least about 1500 hours under those conditions.

DETAILED DESCRIPTION OF THE INVENTION

Figure 1:
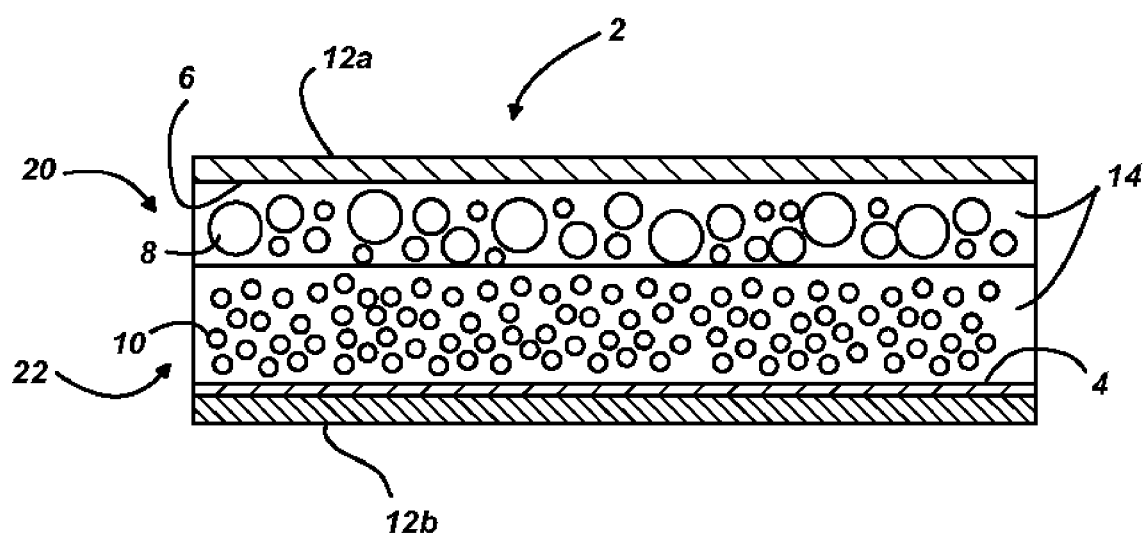
FIG. 1 is a cross-sectional illustration of a conventional thick-film EL lamp.

For a better understanding of the present invention, together with other and further objects, advantages and capabilities thereof, reference is made to the following disclosure and appended claims taken in conjunction with the above-described drawings.

The yellow-emitting phosphor of this invention is made in two firing steps. In the first firing step, zinc sulfide (ZnS) is blended with appropriate amounts of a source of copper (Cu), zinc oxide (ZnO), sulfur (S), a chloride-containing flux, and, optionally, a source of a metal selected from gold and antimony. In a preferred embodiment, the gold source is a pre-mixture of gold chloride ($AuCl_3$) and ZnS, the Cu source is anhydrous copper sulfate ($CuSO_4$), and the Sb source is a pre-mixture of antimony oxide ($Sb_2O_3$) and ZnS. The chloride-containing flux can be a mixture of alkali metal and alkaline earth chlorides, preferably barium chloride ($BaCl_2$), magnesium chloride ($MgCl_2$), and sodium chloride (NaCl). The blended mixture preferably contains in weight percent (wt. %) relative to the weight of ZnS: 0 to 0.018 wt. % Au, 0.06 to 0.12 wt. % Cu, 0 to 0.01 wt. % Sb, 0.3 to 0.7 wt. % ZnO, 6 to 12 wt. % sulfur, and 4 to 14 wt. % chloride flux (preferably 0–4 wt. % of barium chloride, 1–5 wt. % of magnesium chloride, and 1–5 wt. % of sodium chloride).

Alternatively, the zinc sulfide can be replaced by jet-milled coarse over which was generated by sifting a ZnS:Cu,Cl,Au phosphor (e.g. OSRAM Sylvania Type 728) electroluminescent phosphor through 500 mesh screen. Since this coarse over is from completely finished material and typically has at least 0.07% of Cu and 0.006% of Au, additions of Cu and Au in the compounding stage are not needed when such jet-milled coarse over is used.

The blended mixture is fired in air at a temperature from about 1100° C. to about 1250° C. for about 2 to about 5 hours. The fired material is then water washed, dried, and gently mulled (low-intensity milling) to induce defects in its crystal structure. The mulling time depends on the particular type of equipment used and the amount of material being mulled. An optimum mulling time can be readily determined by one skilled in the art of electroluminescent phosphors. Here, a typical mulling time was 75 minutes for 500 g to 550 g of material.

After mulling, the material is washed with acid (by adjusting slurry pH to 0.70 to 1.20 with hydrochloric acid) and then a basic solution containing sodium hydroxide (NaOH), hydrogen peroxide ($H_2O_2$), and a chelating agent, such as diethylenetriaminepentaacetic acid (DTPA). In a preferred method, the basic solution contains relative to the phosphor weight: 2–4.5 wt. % DTPA, 2.5–4.0 wt. % NaOH, and 5–15 wt. % of a 30% $H_2O_2$ solution. This chemical wash further removes flux residues and copper sulfides from the phosphor surface. The material is then washed with hot deionized water and then dried to complete the first firing step.

In the second firing step, the material from the first firing step is blended with appropriate amounts of a copper source, a manganese source, and zinc oxide. Preferably, the material from the first firing step is blended with 0.2–0.8 wt. % anhydrous copper sulfate ($CuSO_4$), 1–6.5 wt. % manganese carbonate ($MnCO_3$), and 5–15 wt. % zinc oxide (ZnO) based on the weight of the material from the first firing step. The blended material is then fired in air at a temperature from about 750° C. to about 950° C. for about 2 to about 5 hours. The fired material is washed with hot deionized water, acid, and the basic solution of DTPA-NaOH—$H_2O_2$ used in the first firing step. After a final water washing to remove any remaining chemical residues, the material is dried and sifted to form a yellow-emitting electroluminescent phosphor.

Phosphors were tested in conventional thick-film electroluminescent lamps operated at 100V and 400 Hz in a 50% R.H, 70° F. environment. Typically, the test lamps are comprised of a ~40 µm-thick phosphor layer and an approximately 26 µm-thick barium titanate dielectric layer. The lamps are constructed by combining the phosphor with a cyanoresin binder (Shin Etsu Co.) which has been dissolved in a mixture of acetone and dimethylformamide. In particular, the binder is made by mixing 575 g of acetone, 575 g of dimethylformamide, and 400 g of cyanoresin. The percentage of phosphor in the liquid binder is 75 wt. % and the percentage of phosphor after the binder-phosphor mix is dried is 80 wt. %. The phosphor suspension is blade coated onto a 0.007–0.0075 in.-thick PET film having a transparent, conductive layer of indium-tin oxide (ITO) (available from CPFilms). After drying, the barium titanate layer is applied over the phosphor layer in the same way using a suspension of barium titantate dispersed in the cyanoresin binder. In particular, the binder-barium titanate mix is made by mixing 375 g of cyanoresin binder, 375 g of barium titanate, and 82.5 g of dimethylformamide. The percentage of barium titanate in the binder is 45 wt. % and the percentage of barium titanate in the binder after drying is 80 wt. %. A rear electrode comprised of a 50 to 80 µm-thick graphite layer is applied to the dried barium titanate dielectric layer using a graphite suspension (Acheson Colloids). Lead wires are attached and the entire lamp is laminated with a clear, flexible film (Aclam TC200 from Honeywell Corp.) which is applied to both sides. The lamps were operated from 24 hours prior to measuring their brightness in order to stabilize the lamps and obtain representative measurements. Brightness as used herein means the brightness of the phosphor in a conventional thick-film electroluminescent lamp which has been operated at 100 V and 400 Hz for 24 hours. Half life is the lamp operating time between the time when 24-hour brightness is measured and the time when the brightness drops to 50% of the initial 24-hour brightness. The x,y color coordinates referred to herein are for the 1931 Commission Internationale de l'Eclairage (CIE) Standard Observer (2°).

EXAMPLE 1

A 550 g amount of ZnS containing about 1 wt. % chlorine was mixed with 15.58 g of a mixture of ZnS and $AuCl_3$ containing 0.5 wt. % Au, 1.20 g of anhydrous $CuSO_4$, 1.65 g of a mixture of ZnS and $Sb_2O_3$ containing 1.67 wt. % Sb, 2.86 g of zinc oxide (ZnO), 45.66 g of sulfur, and a chloride flux containing 8.56 g of barium chloride ($BaCl_2$), 25.68 g of magnesium chloride ($MgCl_2$), and 11.41 g of sodium chloride (NaCl). The mixture was then fired in air at 1150° C. for 4 hours and 10 minutes. The fired material was then washed with hot deionized (DI) water several times to remove most of the chloride flux and dried at 120° C. for 15 hours. The material was mulled for 75 minutes and washed with a hydrochloric acid solution (pH 0.7–1.2) followed by several hot DI water washes (until pH>4) and then a basic solution containing 4 wt. % DTPA, 2.8 wt. % NaOH, and 8.57 wt. % $H_2O_2$ (35% solution). The phosphor was then washed with hot DI water and then dried at 120° C. for 15 hours to complete the first firing step.

In the second firing step, 50 g of material from the first firing step was blended with 0.25 g of $CuSO_4$, 3.16 g of $MnCO_3$, and 5.00 g of ZnO and fired in air at 850° C. for 3 hours and 30 minutes. The material was cooled in the furnace from 850° C. to 450° C. in 3 hours and 30 minutes. After that the fired cake was taken out from the furnace and naturally cooled in air to room temperature. The fired material was washed with hot deionized water, hydrochloric acid, and then twice with a basic solution of DTPA-NaOH—$H_2O_2$ (4.5 wt. % DTPA, 3.8 wt. % NaOH, and 8.57 wt. % $H_2O_2$ (35% solution). After a final water washing, the material was dried and sifted to form a finished, single-component, yellow-emitting electroluminescent phosphor.

EXAMPLE 2

A 550 g amount of jet-milled coarse over, which was generated by sifting OSRAM Sylvania Type 728 electroluminescent phosphor through 500 mesh screen, was mixed with 2.62 g of a mixture of ZnS and $Sb_2O_3$ containing 0.42 wt. % Sb, 2.81 g of zinc oxide (ZnO), 44.84 g of sulfur, and a chloride flux containing 16.82 of barium chloride ($BaCl_2$), 16.82 g of magnesium chloride ($MgCl_2$), and 11.21 g of sodium chloride (NaCl). The mixture was then fired in air at 1150° C. for 4 hours and 10 minutes. The fired material was then washed with hot deionized (DI) water several times to remove most of the chloride flux and dried at 120° C. for 15 hours. The material was mulled for 75 minutes and washed a basic solution containing 4 wt. % DTPA, 2.5 wt. % NaOH, and 10 wt. % $H_2O_2$ (30% solution). The phosphor was then washed with hot DI water and then dried at 120° C. for 15 hours to complete the first firing step.

In the second firing step, 100 g of material from the first firing step was blended with 0.50 g of $CuSO_4$, 6.50 g of $MnCO_3$, and 10.00 g of ZnO and fired in air at 850° C. for one hour. After cooling to room temperature, the material was fired again for one hour. The fired material was washed with hot deionized water, acetic acid, and then twice with a basic solution of DTPA-NaOH—$H_2O_2$ (4 wt. % DTPA, 2.5 wt. % NaOH, and 10 wt. % $H_2O_2$ (30% solution). After a final water washing, the material was dried and sifted to form a finished, single-component, yellow-emitting electroluminescent phosphor.

EXAMPLE 3

This phosphor was made similarly to Example 2 except that the Sb metal was not added in the first step firing.

Thick-film electroluminescent lamps were made with the phosphors from Examples 1–3. The results from the test lamps are given in the following table.

|  | Example 1 | Example 2 | Example 3 |
|---|---|---|---|
| 24 hour brightness (ft-L) | 8.7 | 7.5 | 6.8 |
| x color coordinate | 0.420 | 0.493 | 0.492 |
| y color coordinate | 0.425 | 0.454 | 0.453 |
| Half-life (hours) | 1852 | 1131 | 1026 |
| Efficacy (lm/W) | 1.24 | 1.25 | 1.32 |

While there has been shown and described what are at the present considered the preferred embodiments of the invention, it will be obvious to those skilled in the art that various changes and modifications may be made therein without departing from the scope of the invention as defined by the appended claims.

What is claimed is:

1. An electroluminescent lamp including a single-component, yellow-emitting electroluminescent phosphor, the lamp having an emission having x color coordinate from 0.420 to 0.500 and y color coordinate from 0.420 to 0.440 when operated.

2. The lamp of claim 1 wherein the lamp has an initial brightness of at least 6 foot-Lamberts (ft-L) when operated in a 50% relative humidity (R.H.) and 70° F. environment.

3. The lamp of claim 1 wherein the lamp has an initial brightness of at least 8 ft-L when operated at 100V and 400 Hz in a 50% relative humidity (R.H.) and 70° F. environment.

4. The lamp of claim 2 wherein the lamp exhibits a half-life of at least 1000 hours.

5. The lamp of claim 2 wherein the lamp exhibits a half-life at least 1500 hours.

6. A single-component, yellow-emitting electroluminescent phosphor having an emission having an x color coordinate from 0.420 to 0.500 and y color coordinate from 0.420 to 0.440 when stimulated by an electric field.

7. The phosphor of claim 6 wherein the phosphor has a composition represented by ZnS:Cu,Cl,Mn.

8. The phosphor of claim 7 wherein the phosphor additionally contains a metal selected from gold and antimony.

* * * * *